(12) United States Patent
Fuller et al.

(10) Patent No.: US 8,768,338 B2
(45) Date of Patent: *Jul. 1, 2014

(54) BASE STATION POWER CONTROL IN A MOBILE NETWORK

(71) Applicant: International Business Machines Corporation, Armonk, NY (US)

(72) Inventors: Nicholas C. M. Fuller, North Hills, NY (US); Yasunao Katayama, Tokyo (JP); Arun S. Natarajan, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/685,119

(22) Filed: Nov. 26, 2012

(65) Prior Publication Data
US 2014/0120904 A1    May 1, 2014

Related U.S. Application Data

(63) Continuation of application No. 13/661,750, filed on Oct. 26, 2012.

(51) Int. Cl.
| | |
|---|---|
| *H04W 4/00* | (2009.01) |
| *H04W 24/00* | (2009.01) |
| *H04W 36/00* | (2009.01) |
| *H04W 40/00* | (2009.01) |
| *H04B 17/00* | (2006.01) |

(52) U.S. Cl.
USPC ........ 455/422.1; 455/423; 455/436; 455/424; 455/446; 455/67.13

(58) Field of Classification Search
USPC .......................................................... 455/423
See application file for complete search history.

(56) References Cited

U.S. PATENT DOCUMENTS

| | | | |
|---|---|---|---|
| 6,067,457 A | 5/2000 | Erickson et al. | |
| 8,036,720 B1 | 10/2011 | Conrad et al. | |
| 8,385,909 B1 * | 2/2013 | Bhan et al. | 455/424 |
| 2010/0015926 A1 * | 1/2010 | Luff | 455/67.13 |
| 2010/0291931 A1 * | 11/2010 | Suemitsu et al. | 455/436 |
| 2011/0060621 A1 | 3/2011 | Weller et al. | |
| 2013/0029673 A1 * | 1/2013 | Graves et al. | 455/446 |

OTHER PUBLICATIONS

Office Action dated Apr. 4, 2013 received in the parent U.S. Patent Application, namely U.S. Appl. No. 13/661,750.

* cited by examiner

*Primary Examiner* — Timothy Pham
(74) *Attorney, Agent, or Firm* — Scully, Scott, Murphy & Presser, P.C.; Louis J. Percello, Esq.

(57) ABSTRACT

The present disclosure relates generally to the field of base station power control in a mobile network. In various examples, base station power control in a mobile network may be implemented in the form of systems, methods and/or algorithms.

24 Claims, 7 Drawing Sheets

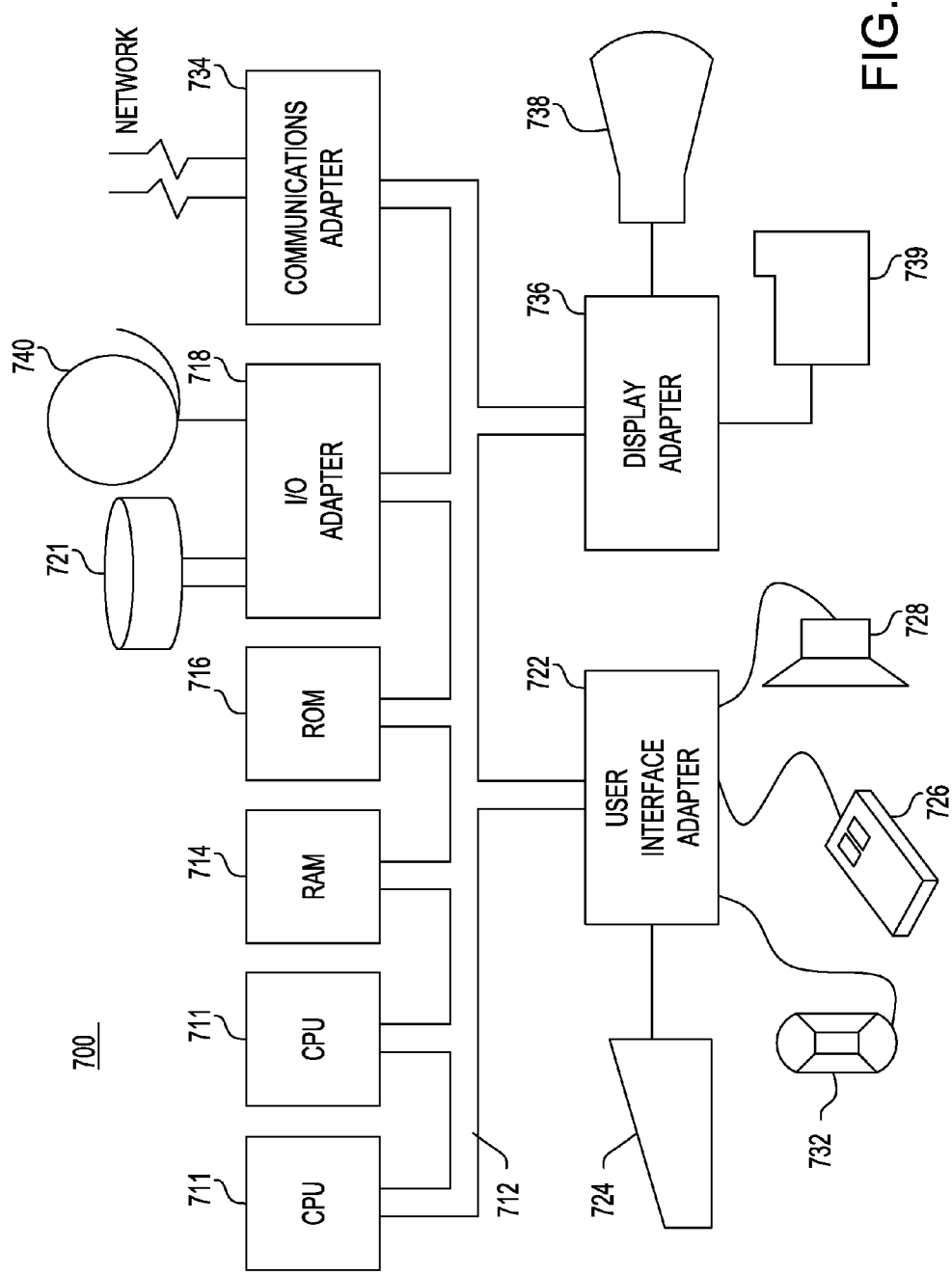

BASE STATION POWER CONTROL IN A MOBILE NETWORK

RELATED APPLICATION

This application is a continuation of U.S. Ser. No. 13/661,750, filed Oct. 26, 2012, the entire contents of which are incorporated herein by reference.

BACKGROUND

The present disclosure relates generally to the field of base station power control in a mobile network.

In various examples, base station power control in a mobile network may be implemented in the form of systems, methods and/or algorithms.

DESCRIPTION OF RELATED ART

Dropped call rates are typically at least 1% and can be as high as 5% for major US service providers. This issue is typically addressed in urban areas primarily by a migration to technologies such as femto/pico cell, multiple frequency bands, and "beaming". For mobile users (in particular, in sub-urban/rural environments), these technologies are helpful, but will still typically not completely mitigate the issue.

In conventional mobile networks, certain RF power control devices are provided (e.g., in the context of a cell phone—base station "handshake"). Further, conventional mobile units may employ static-dynamic network optimization. Further still, wireless mesh networks may be utilized.

SUMMARY

The present disclosure relates generally to the field of base station power control in a mobile network.

In various examples, base station power control in a mobile network may be implemented in the form of systems, methods and/or algorithms.

In one embodiment, a method implemented in a computer system for base station power control in a mobile network, wherein the mobile network covers a plurality of geographic regions and wherein a plurality of users are in communication with the mobile network, is provided, the method comprising: receiving, by the computer system, historic data, wherein the historic data comprises data that is indicative of historic dropped calls within a respective one of each of the plurality of the geographic regions; receiving, by the computer system, real-time data, wherein the real-time data comprises data that is indicative of real-time dropped calls within a respective one of each of the plurality of the geographic regions; determining by the computer system, based at least in part upon the received historic data and the received real-time data, a first underperforming geographic region, wherein the first underperforming geographic region is one of the plurality of geographic regions having a higher occurrence of dropped calls than at least one of the other plurality of geographic regions; determining by the computer system whether a first one of the plurality of users is communicating with the mobile network from the first underperforming geographic region; and adjusting a base station transmission power in the first underperforming region for the first user after it has been determined that the first user is communicating with the mobile network from the first underperforming geographic region.

In another embodiment, a computer readable storage medium, tangibly embodying a program of instructions executable by the computer for base station power control in a mobile network, wherein the mobile network covers a plurality of geographic regions and wherein a plurality of users are in communication with the mobile network, is provided, the program of instructions, when executing, performing the following steps: receiving, by the computer, historic data, wherein the historic data comprises data that is indicative of historic dropped calls within a respective one of each of the plurality of the geographic regions; receiving, by the computer, real-time data, wherein the real-time data comprises data that is indicative of real-time dropped calls within a respective one of each of the plurality of the geographic regions; determining by the computer, based at least in part upon the received historic data and the received real-time data, a first underperforming geographic region, wherein the first underperforming geographic region is one of the plurality of geographic regions having a higher occurrence of dropped calls than at least one of the other plurality of geographic regions; determining by the system whether a first one of the plurality of users is communicating with the mobile network from the first underperforming geographic region; and adjusting a base station transmission power in the first underperforming region for the first user after it has been determined that the first user is communicating with the mobile network from the first underperforming geographic region.

In another embodiment, a computer-implemented system for base station power control in a mobile network, wherein the mobile network covers a plurality of geographic regions and wherein a plurality of users are in communication with the mobile network, is provided, the system comprising: a receiving element receiving configured to: (a) receive historic data, wherein the historic data comprises data that is indicative of historic dropped calls within a respective one of each of the plurality of the geographic regions; and (b) receive real-time data, wherein the real-time data comprises data that is indicative of real-time dropped calls within a respective one of each of the plurality of the geographic regions; a determining element in operative communication with the receiving element configured to determine: (a) based at least in part upon the received historic data and the received real-time data, a first underperforming geographic region, wherein the first underperforming geographic region is one of the plurality of geographic regions having a higher occurrence of dropped calls than at least one of the other plurality of geographic regions; and (b) whether a first one of the plurality of users is communicating with the mobile network from the first underperforming geographic region; and an adjusting element in operative communication with the determining element and the base station for adjusting base station transmission power in the first underperforming region for the first user after it has been determined that the first user is communicating with the mobile network from the first underperforming geographic region.

In yet another embodiment, in some situations and for specific geographies (e.g., for stadiums, emergency response situations etc.) past performance in one geography may be used to build models that are applied to future similar events in other geographies.

BRIEF DESCRIPTION OF THE DRAWINGS

Various objects, features and advantages of the present invention will become apparent to one skilled in the art, in view of the following detailed description taken in combination with the attached drawings, in which:

FIG. 7 depicts a block diagram of a system according to an embodiment of the present invention.

DETAILED DESCRIPTION

For the purposes of description the term "real-time" (e.g., as used in the context of real-time data or real-time usage) is intended to refer to cause and effect occurring approximately contemporaneously in time (e.g., without significant time lag between cause and effect but not necessarily instantaneously).

For the purposes of description, the term "historic" (e.g., as used in the context of historic data or historic usage) is intended to refer to non-real-time (e.g., having a significant time lag between cause and effect (such as hours or days)).

For the purposes of description, the term "static-dynamic network optimization" or "static-dynamic power control" is intended to refer to network providers adjusting power on an individual user basis without regard to aggregate call drop occurrences and on a relatively long time scale based on accumulated network traffic data that is not real-time data.

As described herein, various embodiments provide for dynamic base station power control (e.g., distribution). In one specific example, the dynamic base station power control is aimed at a dropped call mitigation strategy.

Figure 1A:
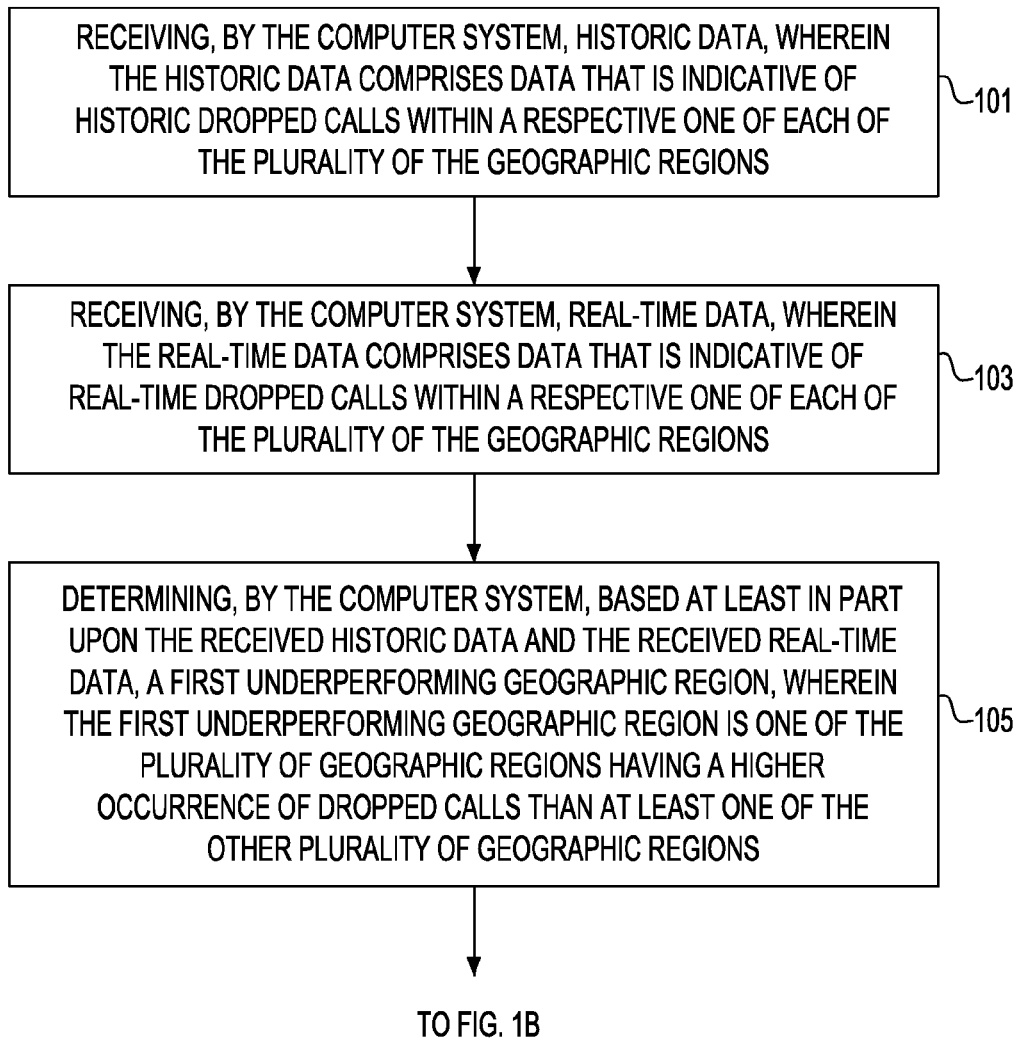
FIGS. 1A and 1B depict a flowchart of a method according to an embodiment of the present invention.
Figure 1B:
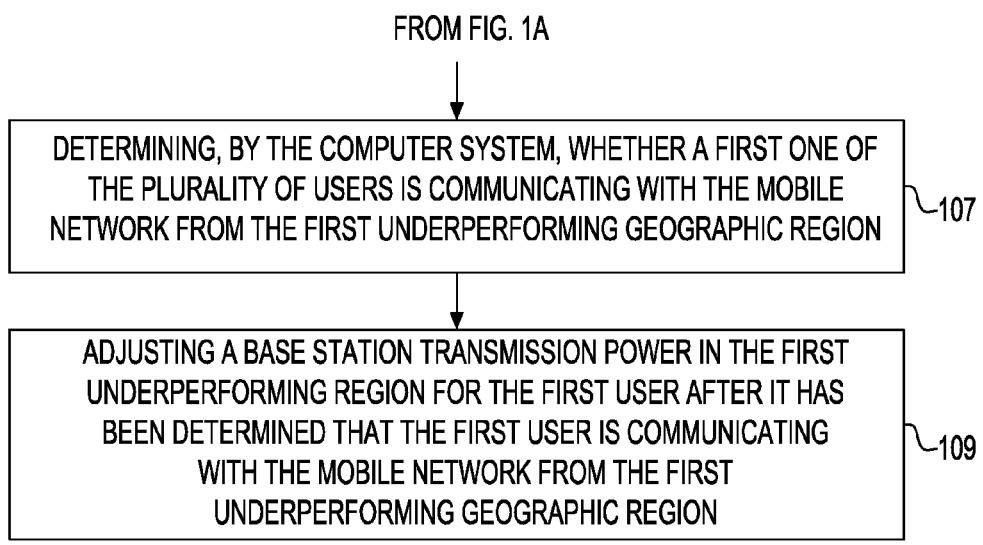

Referring now to FIGS. 1A and 1B, a method implemented in a computer system for base station power control in a mobile network is shown (in this embodiment, the mobile network covers a plurality of geographic regions and a plurality of users are in communication with the mobile network). As seen in these FIGS. 1A and 1B, the method comprises: Step 101—receiving, by the computer system, historic data, wherein the historic data comprises data that is indicative of historic dropped calls within a respective one of each of the plurality of the geographic regions; Step 103—receiving, by the computer system, real-time data, wherein the real-time data comprises data that is indicative of real-time dropped calls within a respective one of each of the plurality of the geographic regions; Step 105—determining by the computer system, based at least in part upon the received historic data and the received real-time data, a first underperforming geographic region, wherein the first underperforming geographic region is one of the plurality of geographic regions having a higher occurrence of dropped calls than at least one of the other plurality of geographic regions; Step 107—determining by the computer system whether a first one of the plurality of users is communicating (e.g., via a mobile terminal such as a cell phone or the like) with the mobile network from the first underperforming geographic region; and Step 109—adjusting a base station transmission power in the first underperforming region for the first user (that is, for the first user's mobile terminal) after it has been determined that the first user is communicating with the mobile network (e.g., via a mobile terminal such as a cell phone or the like) from the first underperforming geographic region.

In one example, any steps may be carried out in the order recited or the steps may be carried out in another order.

Figure 2:
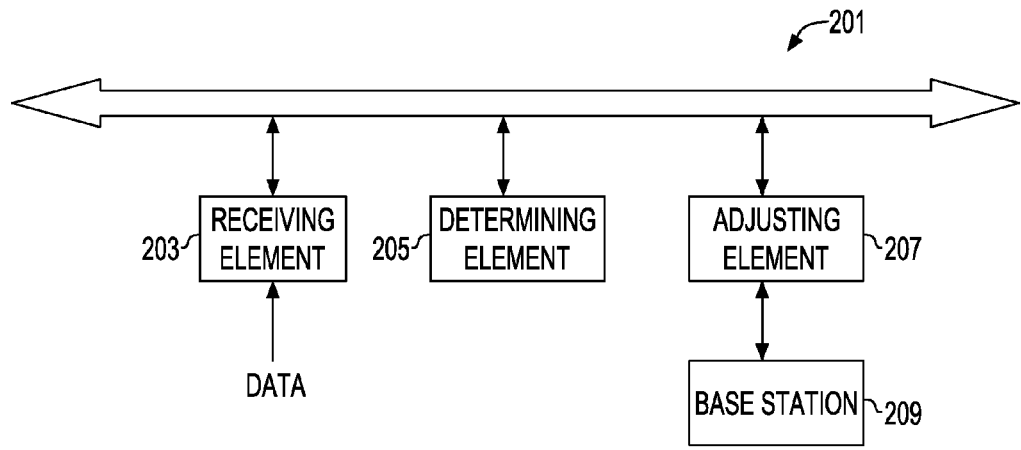
FIG. 2 depicts a block diagram of a system according to an embodiment of the present invention.

Referring now to FIG. 2, a computer-implemented system 201 for base station power control in a mobile network (wherein the mobile network covers a plurality of geographic regions and wherein a plurality of users are in communication with the mobile network) is shown. As seen in this FIG. 2, the system 201 may comprise: a receiving element 203 configured to: (a) receive historic data, wherein the historic data comprises data that is indicative of historic dropped calls within a respective one of each of the plurality of the geographic regions; and (b) receive real-time data, wherein the real-time data comprises data that is indicative of real-time dropped calls within a respective one of each of the plurality of the geographic regions; a determining element 205 in operative communication with the receiving element configured to determine: (a) based at least in part upon the received historic data and the received real-time data, a first underperforming geographic region, wherein the first underperforming geographic region is one of the plurality of geographic regions having a higher occurrence of dropped calls than at least one of the other plurality of geographic regions; and (b) whether a first one of the plurality of users is communicating (e.g., via a mobile terminal such as a cell phone or the like) with the mobile network from the first underperforming geographic region; and an adjusting element 207 in operative communication with the determining element and the base station 209 for adjusting base station transmission power in the first underperforming region for the first user (that is, for the first user's mobile terminal) after it has been determined that the first user is communicating with the mobile network (e.g., via a mobile terminal such as a cell phone or the like) from the first underperforming geographic region.

Still referring to FIG. 2, any communications (e.g., receiving of data, adjusting of the base station transmission power) may be carried out via a network. Such a network may comprise the Internet, an intranet, a local area network, a wide area network and/or any other desired communication channel(s). In another example, some or all of the elements of FIG. 2 may be implemented in a computer system of the type shown in FIG. 7.

Figure 3:
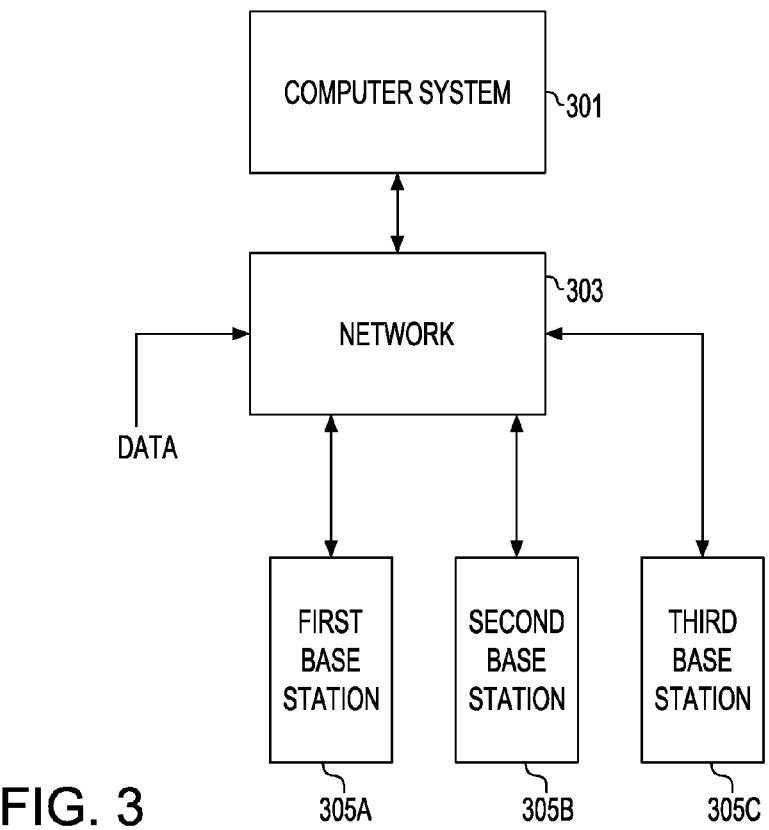
FIG. 3 depicts a block diagram of a system according to an embodiment of the present invention.

Referring now to FIG. 3, a computer-implemented system 301 for base station power control in a mobile network (wherein the mobile network covers a plurality of geographic regions and wherein a plurality of users are in communication with the mobile network) is shown. As seen in this FIG. 3, the system 301 (which may be of the same type as system 201 of FIG. 2) may receive data via network 303. In one example, the data may comprise: (a) historic data, wherein the historic data comprises data that is indicative of historic dropped calls within a respective one of each of the plurality of the geographic regions; and (b) real-time data, wherein the real-time data comprises data that is indicative of real-time dropped calls within a respective one of each of the plurality of the geographic regions.

Still referring to FIG. 3, system 301 may communicate via network 303 with each of first base station 305A, second base station 305B and third base station 305C (such communications may be, for example, for the purposes of adjusting (for each respective base station) a base station transmission power (for a given user)). Of note, while three base stations are shown, any desired number of base stations may be used and/or subject to adjustment. Further, any desired number of users may be accommodated. Further still, network 303 may comprise the Internet, an intranet, a local area network, a wide area network and/or any other desired communication channel(s). In another example, some or all of the elements of FIG. 3 may be implemented in a computer system of the type shown in FIG. 7.

Figure 4:
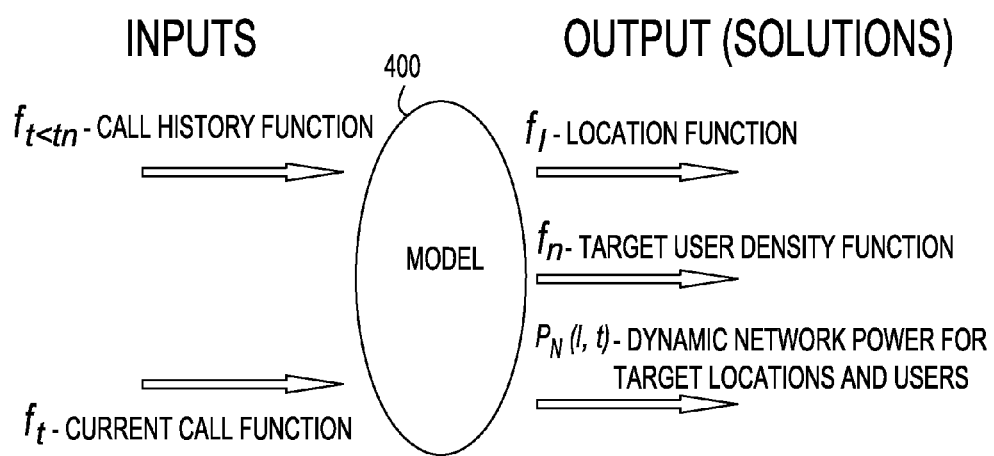
FIG. 4 depicts a block diagram of a model according to an embodiment of the present invention.

Referring now to FIG. 4, a block diagram of a model 400 (e.g., a computer model) according to one embodiment is shown. As seen, the model of this embodiment receives the following inputs: (a) Call history function; and (b) Current call function. Further, the model of this embodiment outputs the following solutions: (a) Location function; (b) Target user density function; and (c) Dynamic network power (for target locations and users).

In one specific example, the various functions may be as follows:

Function (1) $f_{t_h<t}(t_c, R_{dc}, l, n, P_N(l, t))$—Call history function

Function (2) $f_t(t, l, n, P_N(l, t))$—Current call function

Function (3) $f_l(t, l, n, P_N(l, t))$—Location function

Function (4) $f_l(t, l, n, P_N(l, t))$—Target user density function

Further, in this example, the variables related to the various functions may be as follows: t—time; $t_c$—call duration; l—location; $R_{dc}$—drop call rate; n—user density; $P_N$ (l, t)—Dynamic Network power. In addition, $t_h$ represents historical time at the present. For clarity, it is noted that in Function (1) the notation should be f subscript ((t subscript h)<t)).

Figure 5:
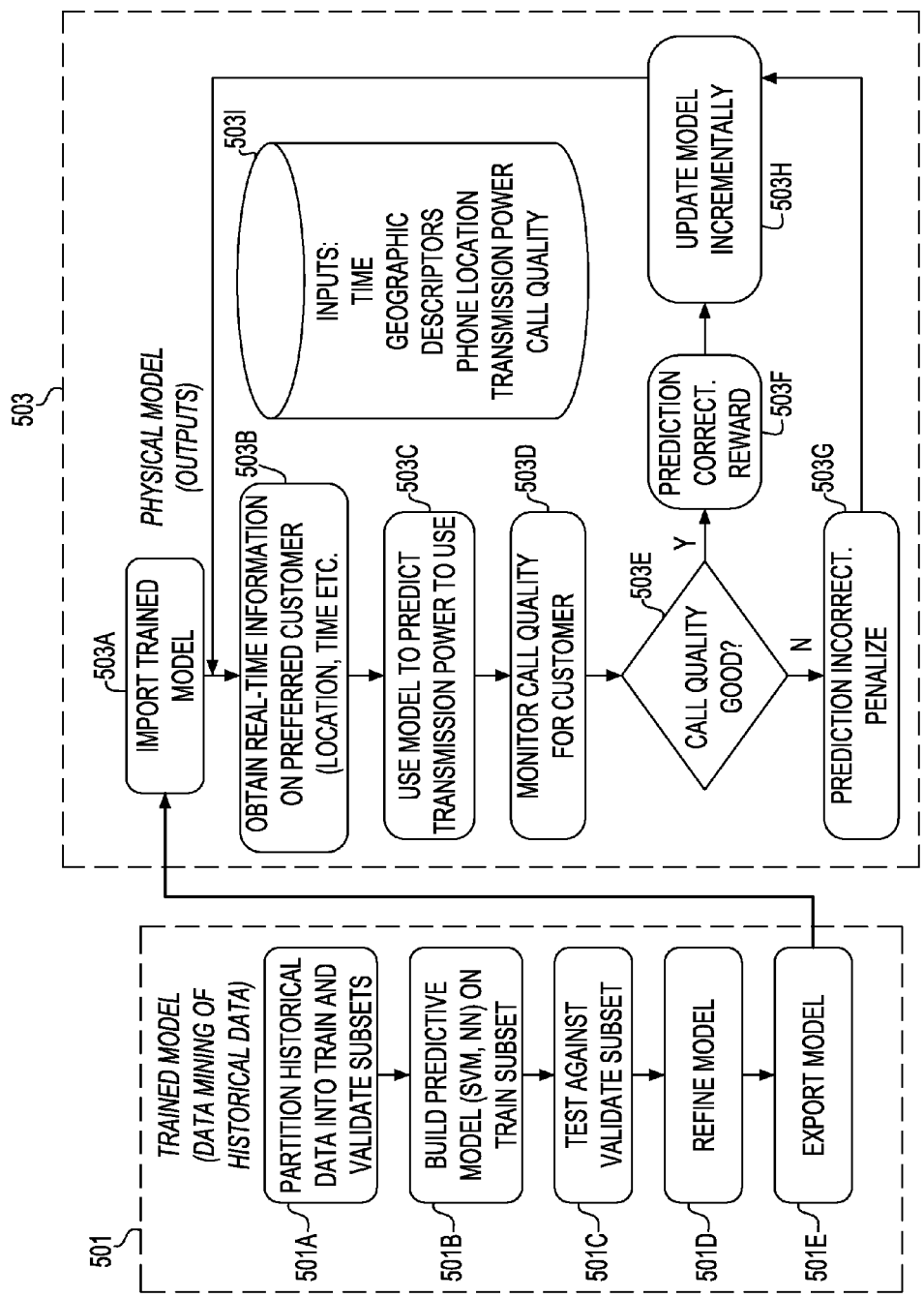
FIG. 5 depicts a flowchart of a method related to generation and use of a model of the type of FIG. 4 according to an embodiment of the present invention.

Referring now to FIG. 5, a flowchart of a method related to generation and use of a model of the type of FIG. 4 is shown. As seen in this FIG. 5, a "dual-type" model design may be utilized. More particularly, in this example, a first component 501 is based on machine learning (e.g., support vector machines, neural nets) to assemble and iterate on a "trained" model of historical calls. This first component 501 may include: 501A—Partition historical data into train and validate subsets; 501B—Build predictive model (e.g., support vector machines, neural nets) on train subset; 501C—Test against validate subset; 501D—Refine model; and 501E—Export model.

Still referring to FIG. 5, in this example, a second component 503 is that which will deliver outputs (see, e.g., the outputs of model 400 of FIG. 4). In one example, this is a physical model of a radio wave transmission that would be used to construct a map of a given geography to map the received signal strength at different parts of a region which would, at least in part, be used to predict what should be done when a particular mobile device user is in a particular region.

Still referring to FIG. 5, in this example, the second component may include: 503A—Import trained model; 503B—Obtain real-time information on preferred customer (e.g. location, time); 503C—Use model to predict transmission power to use; 503D—Monitor call quality for customer; and 503E—Call quality good? At this point, a branch occurs. If call quality is good (that is, above a threshold), then go to 503F—Prediction correct; reward. If call quality is not good (that is, not above a threshold), then go to 503G—Prediction incorrect; penalize. In either case, from 503F or 503G, go to 503H—Update model incrementally. Next, feed back into 503B.

Still referring to FIG. 5, it is seen that inputs 5031 (which may be stored in a database or the like) may include (but not be limited to): Time; Geographic descriptors, Phone (mobile device) location, Transmission power, and/or Call quality.

Figure 6:
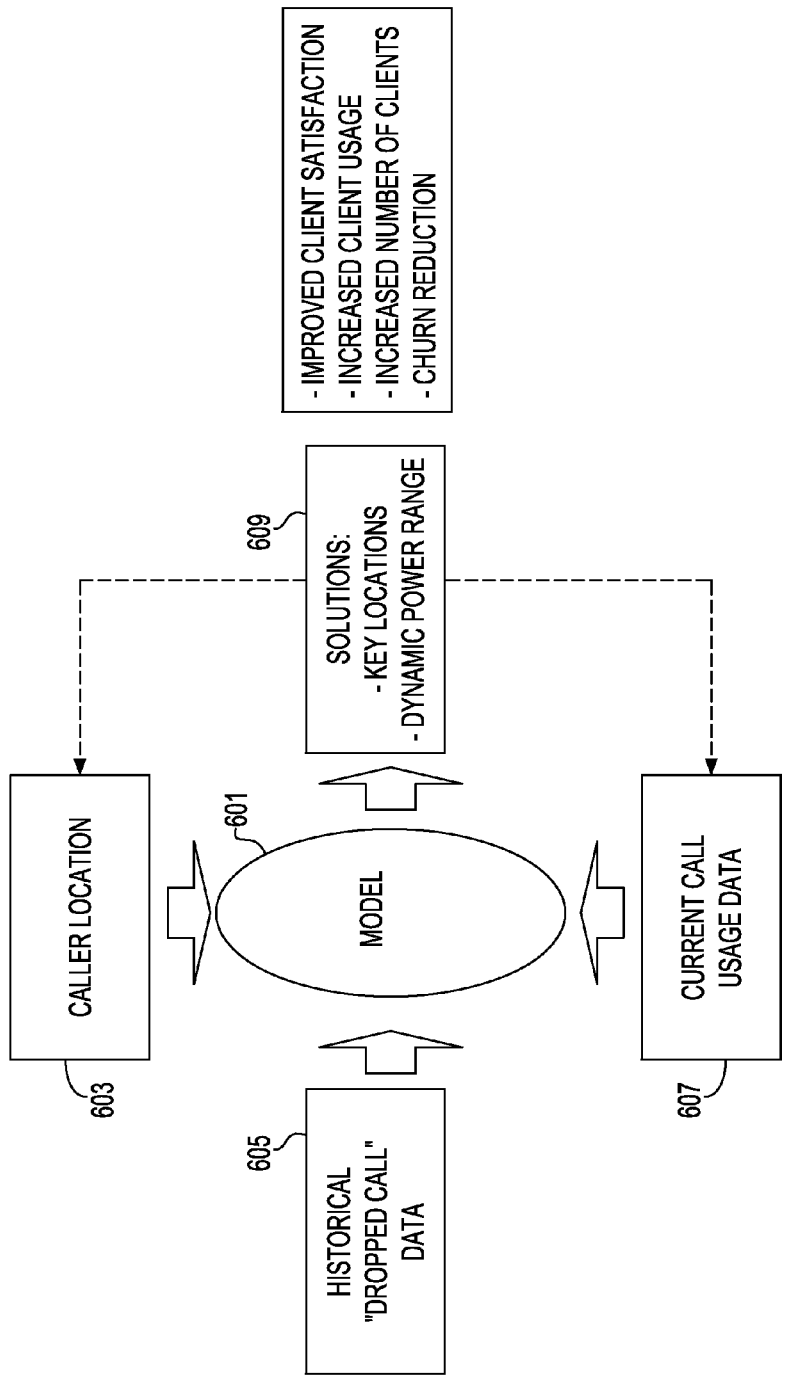
FIG. 6 depicts a flowchart of a method related to use of a model of the type of FIG. 4 according to an embodiment of the present invention.

Referring now to FIG. 6, a flowchart of a method related to use of a model of the type of FIG. 4 is shown. As seen in this FIG. 6, model 601 may receive as inputs user (e.g., caller) location 603, historical dropped call data 605 and current call usage data 607. Further, outputs (solutions) 609 from model 601 may include (but not be limited to): key geographic locations and dynamic power range (as seen, feedback data may be provided). Of note, solutions provided may result in one or more of the following: (a) improved client (user) satisfaction; (b) increased client (user) usage; (c) increased number of clients (users); and/or churn reduction. Further, various embodiments may provide for opportunities such as dynamic power management and distribution; provision of various analytics; and/or provision of various services.

Of note, there are many known RF propagation models that examine attenuation for both indoor and outdoor environments. For outdoor attenuation, various environments can also be considered including: foliage, terrain, and city landscapes. For the purposes of this disclosure, in one example, RF propagation in an outdoor environment taking into account foliage, terrain, and air (natural RF propagation) is most appropriate (e.g., in the form of a linear combination of all of these components). Various specific examples for each component follow:

A well known RF attenuation model due to foliage is the Weissberger model which covers a frequency range from 230 MHz to 95 GHz and has a validity depth of foliage of up to 400 m. The model is expressed as:

$$L_1 = 1.33 f^{0.284} d^{0.588}, \text{ if } 14 < d \leq 400 \qquad (1)$$

$$0.45 f^{0.284} d, \text{ if } 0 < d \leq 14 \qquad (2)$$

Where:
$L_1$=Loss due to foliage (dB)
f=transmission frequency; unit (GHz)
d=depth of foliage "along" the RF path (m)

Attenuation in air must be taken into account which goes as:

$L_2 = 20 \lg (4\pi d/X)$, where $L_2$ is loss due to air (dB), d is the distance from transmitter (m), and λ is the wavelength of the transmission (m).

For terrain induced attenuation, the ITU (International Telecommunication Union) Terrain Model can be utilized. This model was developed on the basis of diffraction theory and predicts the path loss as a function of the height of the path blocked and the first Fresnel zone for the transmission link. This can be expressed as follows:

$$L_3 = 10 - 20 C_N$$

$$C_N = h/F_1$$

$$h = h_L - h_0$$

$$F_1 = 17.3 (d_1 d_2/fd)^{1/2}$$

Where:
$L_3$=attenuation due to terrain (dB)
$C_N$=normalized terrain clearance
$h_L$=height of the line of sight (m)
$h_0$=height of obstruction (m)
$F_1$=radius of $1^{st}$ Fresnel zone (km)
$d_1$=distance of obstruction from one base station (km)
$d_2$=distance of obstruction from other base station (km)
f=transmission frequency (GHz)
d=distance from transmitter (km)

Thus, for the approach outlined in the physical model detailed herein, in one example, losses due to foliage, air, and terrain would all have to be taken into account (i.e., $L = L_1 + L_2 + L_3$) to come up with an accurate assessment of the RF propagation in sub-urban/rural environments for mobile users; these may be combined, for example, with empirical predictions based on historic dropped call data.

In another example, a "trained" (historic) model of the type described herein may be based on empirical data.

Referring now to FIG. 7, this figure shows a hardware configuration of computing system 700 according to an embodiment of the present invention. As seen, this hardware configuration has at least one processor or central processing unit (CPU) 711. The CPUs 711 are interconnected via a system bus 712 to a random access memory (RAM) 714, read-only memory (ROM) 716, input/output (I/O) adapter 718 (for connecting peripheral devices such as disk units 721 and tape drives 740 to the bus 712), user interface adapter 722 (for connecting a keyboard 724, mouse 726, speaker 728, microphone 732, and/or other user interface device to the bus 712), a communications adapter 734 for connecting the system 700 to a data processing network, the Internet, an Intranet, a local area network (LAN), etc., and a display adapter 736 for connecting the bus 712 to a display device 738 and/or printer 739 (e.g., a digital printer or the like).

In other examples, base station power adjustment may be calculated via an algorithm to determine base station power to minimize a cost function (e.g., where different users might have different weights attached to the probability of call dropping depending on priority levels as well as a weight attached to the power consumption of the base station itself).

In other examples, any function described herein may be provided in the form of an output (e.g., an output from a model).

In other examples, model and/or algorithm dependencies according to various embodiments may include (but not be limited to): Dropped-Call Historical Data; Current Call Usage Data—Caller Density; Customer Location and/or Distances between customers.

In other examples, insight useful for implementing various embodiments may be received from marketing, sales, finance, customer care and/or network inputs.

In another example, reduced dropped calls in sub-urban/rural environments facilitated by dynamic base station power allocation may be provided. Such reduction in dropped calls may result in increased customer satisfaction (e.g., leading to a reduction in customer churn rate). Such reduction in dropped calls may also result in the following beneficial network impact: (a) avoiding lost revenue (if a fraction of dropped calls do not get re-established by the network then for some subset of these calls (e.g., minute-based plans) there will be lost revenue; and/or (b) avoiding call re-establishment network costs.

As described herein, various embodiments provide for selectively reducing the frequency (occurrence) of dropped calls. In one example, the reduction in the frequency of dropped calls is for high usage (priority) customers and/or customers in sub-urban/rural areas.

One specific example may operate as follows: perform analysis of historical cell phone usage and dropped call data for customers (e.g., of major service providers) as a function of location in predominantly sub-urban/rural areas; identify specific locations and customers in the sub-urban/rural areas wherein a high frequency of dropped calls are experienced; for existing base station layout, dynamically optimize and increase base station transmission power for the identified key locations and high usage customers; and/or perform dynamic optimization of increased power necessary to mitigate call interference. In another specific example, the base station transmission power will be capped in dependence upon a current FCC safety limit.

In another embodiment, implementation may be in the context of various vendors in a multi network/CSP environment.

In another embodiment, implementation may be made on a carrier by carrier basis (e.g., wherein optimal cost will be based on value for carrier).

In another embodiment, implementation may be based on dynamic base station power distribution/antenna tilt (aimed at reducing dropped call frequency) by leveraging one or more of the following: (a) Streams Middleware; (b) Tivoli; and/or (c) Cloud technology.

In another embodiment, network analytics may include and/or be updated to include dynamic base station power delivery for selective dropped called mitigation.

In other examples, smart wireless use of technology and analytics to mitigate cellular dropped call frequency for high usage customers (that is, priority call control) may be provided.

In other examples, analytics engines (e.g., software analytics engines) may be used to analyze dropped call frequency as a function of geography in sub-urban and/or rural environments and identify key geographies where dynamic optimization of and increased transmission power of base stations (e.g., cellular base stations) would facilitate reduced dropped call frequency (which may tend to enable increased profitability of various wireless service providers through increased customer usage and/or new clients).

In other examples, embodiments may be applied to various "niche" applications (for example, embodiments may be applied to emergency response personnel so that higher priority for their communication is achieved).

In other examples, priority call control, dynamic base station power management and/or RF beaming may be provided.

In other examples, triggering base station power control for one or more specific users may be provided.

In other examples, analytics performed on historic and/or current calls in a given area (geography) may be provided.

In other examples, dropped call mitigation may be provided only for premium customers (e.g., customers paying additional money).

In other examples, dynamic adjustments triggered by the location of one or more specific users may be provided.

In various embodiments, one or more of the following 3GPP SON API Standards may be implemented.

Regarding Base Station Hand-Off Parameter Optimization (3GPP SON R9): 3GPP TR 36.902 Version 9.3.1 Release 9 (2011-05) is SON use cases and solutions (This defines the use cases for handover optimization). 3GPP TS 32.425 Version 9.8.0 Release 9 (2012-03) is Performance measurements E-UTRAN; 3GPP TS 32.521 Version 9.0.0 Release 9 is SON Integration Reference Point Requirements (this has the high level requirements for both Capacity and Coverage Optimization and Handover Parameter optimization); 3GPP TS 32.522 Version 9.1.1 Release 9 (2010-10) is SON Integration Reference Point Information Service (Section 4.3 is Handover Parameter Optimization Function. Section 4.5 Capacity and Coverage Optimization is empty in Release 9); 3GPP TS 32.523 Version 9.2.0 Release 9 (2011-01) is SON Integration Reference Point CORBA Solution Set; 3GPP TS 36.331 Version 9.10.0 Release 9 (2012-10) is LTE Radio Resource Control Protocol specification (This includes the detailed handover parameters, and the actual Handover Command message sent from the target eNodeB to the source eNodeB). Of note, 36.902/32.521/32.522 and 36.331 are the more relevant sections for Handover Optimization in R9. Of further note, the RRC (Radio Resource Control) function is the basis for handover (vendor implementation of RRC may be proprietary).

Regarding Antenna Tilt (3GPP SON R10): 3GPP TS 25.466 Version 10.3.0 Release 10 (2012-01) is UTRAN Iuant interface: application part (Describes the procedures for setting antenna tilt); 3GPP TR 32.642 Version 8.4.0 Release 8 (2011-01) Config Management Network Resource Model includes the parameters for antenna tilt for RET antennas (Annex B is the RET Control Architecture. (RET=Remote Electrical Tilt)); 3GPP TS 25.463 Version 6.4.0 Release 6 (2005-09) is UTRAN Iuant Remote Electrical Tilting (RET) antennas signaling.

In one embodiment, a method implemented in a computer system for base station power control in a mobile network, wherein the mobile network covers a plurality of geographic regions and wherein a plurality of users are in communication with the mobile network, is provided, the method comprising: receiving, by the computer system, historic data, wherein the historic data comprises data that is indicative of historic dropped calls within a respective one of each of the plurality of the geographic regions; receiving, by the computer system, real-time data, wherein the real-time data comprises data that is indicative of real-time dropped calls within a respective one of each of the plurality of the geographic regions; determining by the computer system, based at least in part upon the received historic data and the received real-time data, a first underperforming geographic region, wherein the first underperforming geographic region is one of the plurality of geographic regions having a higher occurrence of dropped calls than at least one of the other plurality of geographic regions; determining by the computer system whether a first one of the plurality of users is communicating with the mobile network from the first underperforming geographic region; and adjusting a base station transmission power in the first underperforming region for the first user after it has been determined that the first user is communicating with the mobile network from the first underperforming geographic region.

In one example, the historic data further comprises data that is indicative of historic usage within a respective one of each of the plurality of the geographic regions.

In another example, the real-time data further comprises data that is indicative of real-time usage within a respective one of each of the plurality of the geographic regions.

In another example, the method further comprises: determining by the computer system whether each of the plurality of the users is communicating with the mobile network from the first underperforming geographic region; and adjusting a base station transmission power for each of the plurality of users after it has been determined that each of the plurality of users is communicating with the mobile network from the first underperforming geographic region.

In another example, the method further comprises: determining by the computer system whether each of a plurality of a subset of the plurality of the users is communicating with the mobile network from the first underperforming geographic region; and adjusting a base station transmission power for each of the plurality of the subset (e.g., independently) after it has been determined that each of the plurality of the subset is communicating with the mobile network from the first underperforming geographic region.

In another example, the method further comprises: adjusting the base station transmission power for the first user based at least in part upon the received historic data and the received real-time data.

In another example, the method further comprises: adjusting the base station transmission power for the first user based at least in part upon the received historic data for the first underperforming region and the received real-time data for the first underperforming region.

In another example, the higher occurrence of dropped calls comprises one of: (a) an absolute higher occurrence of dropped calls; and (a) a percent occurrence of dropped calls relative to a number of users.

In another example, the adjustment of the base station transmission power in the first underperforming region for the first user results in at least one less dropped call for the first user while in the first underperforming region than would have occurred in the absence of the adjustment of the base station transmission power in the first underperforming region for the first user.

In another example, the historic data further comprises data that is indicative of historic usage in a geographic region at which a group of people gather.

In another example, the group of people gather at a spectator event (e.g., a sporting event, a political rally, a theatrical event).

In another example, the geographic region at which the spectator event occurs comprises a stadium (e.g., an outdoor stadium, an indoor stadium).

In another example, the group of people gather at an emergency response situation (e.g., a natural disaster such as a hurricane, a tornado, an earthquake, a flood or a man-made disaster such as a transportation or industrial accident).

In another example, the data that is indicative of historic usage in a geographic region at which the group of people gather is used to build a model applicable to a group of people gathering at a different geographic region (e.g., at a similar event).

In another embodiment, a computer readable storage medium, tangibly embodying a program of instructions executable by the computer for base station power control in a mobile network, wherein the mobile network covers a plurality of geographic regions and wherein a plurality of users are in communication with the mobile network, is provided, the program of instructions, when executing, performing the following steps: receiving, by the computer, historic data, wherein the historic data comprises data that is indicative of historic dropped calls within a respective one of each of the plurality of the geographic regions; receiving, by the computer, real-time data, wherein the real-time data comprises data that is indicative of real-time dropped calls within a respective one of each of the plurality of the geographic regions; determining by the computer, based at least in part upon the received historic data and the received real-time data, a first underperforming geographic region, wherein the first underperforming geographic region is one of the plurality of geographic regions having a higher occurrence of dropped calls than at least one of the other plurality of geographic regions; determining by the system whether a first one of the plurality of users is communicating with the mobile network from the first underperforming geographic region; and adjusting a base station transmission power in the first underperforming region for the first user after it has been determined that the first user is communicating with the mobile network from the first underperforming geographic region.

In one example, the historic data further comprises data that is indicative of historic usage within a respective one of each of the plurality of the geographic regions.

In another example, the real-time data further comprises data that is indicative of real-time usage within a respective one of each of the plurality of the geographic regions.

In another example, the program of instructions, when executing, further performs the following steps: determining by the computer whether each of the plurality of the users is communicating with the mobile network from the first underperforming geographic region; and adjusting a base station transmission power for each of the plurality of users after it has been determined that each of the plurality of users is communicating with the mobile network from the first underperforming geographic region.

In another example, the program of instructions, when executing, further performs the following steps: determining by the computer whether each of a plurality of a subset of the plurality of the users is communicating with the mobile network from the first underperforming geographic region; and adjusting a base station transmission power for each of the plurality of the subset (e.g., independently) after it has been determined that each of the plurality of the subset is communicating with the mobile network from the first underperforming geographic region.

In another example, the program of instructions, when executing, further performs the following step: adjusting the base station transmission power for the first user based at least in part upon the received historic data and the received real-time data.

In another example, the program of instructions, when executing, further performs the following step: adjusting the base station transmission power for the first user based at least in part upon the received historic data for the first underperforming region and the received real-time data for the first underperforming region.

In another example, the higher occurrence of dropped calls comprises one of: (a) an absolute higher occurrence of dropped calls; and (a) a percent occurrence of dropped calls relative to a number of users.

In another example, the adjustment of the base station transmission power in the first underperforming region for the first user results in at least one less dropped call for the first user while in the first underperforming region than would have occurred in the absence of the adjustment of the base station transmission power in the first underperforming region for the first user.

In another example, the historic data further comprises data that is indicative of historic usage in a geographic region at which a group of people gather.

In another example, the group of people gather at a spectator event (e.g., a sporting event, a political rally, a theatrical event).

In another example, the geographic region at which the spectator event occurs comprises a stadium (e.g., an outdoor stadium, an indoor stadium).

In another example, the group of people gather at an emergency response situation (e.g., a natural disaster such as a hurricane, a tornado, an earthquake, a flood or a man-made disaster such as a transportation or industrial accident).

In another example, the data that is indicative of historic usage in a geographic region at which the group of people gather is used to build a model applicable to a group of people gathering at a different geographic region (e.g., at a similar event).

In another embodiment, a computer-implemented system for base station power control in a mobile network, wherein the mobile network covers a plurality of geographic regions and wherein a plurality of users are in communication with the mobile network, is provided, the system comprising: a receiving element receiving configured to: (a) receive historic data, wherein the historic data comprises data that is indicative of historic dropped calls within a respective one of each of the plurality of the geographic regions; and (b) receive real-time data, wherein the real-time data comprises data that is indicative of real-time dropped calls within a respective one of each of the plurality of the geographic regions; a determining element in operative communication with the receiving element configured to determine: (a) based at least in part upon the received historic data and the received real-time data, a first underperforming geographic region, wherein the first underperforming geographic region is one of the plurality of geographic regions having a higher occurrence of dropped calls than at least one of the other plurality of geographic regions; and (b) whether a first one of the plurality of users is communicating with the mobile network from the first underperforming geographic region; and an adjusting element in operative communication with the determining element and the base station for adjusting base station transmission power in the first underperforming region for the first user after it has been determined that the first user is communicating with the mobile network from the first underperforming geographic region.

In one example, the historic data further comprises data that is indicative of historic usage within a respective one of each of the plurality of the geographic regions.

In another example, the real-time data further comprises data that is indicative of real-time usage within a respective one of each of the plurality of the geographic regions.

In another example: the determining element determines whether each of the plurality of the users is communicating with the mobile network from the first underperforming geographic region; and the adjusting element adjusts a base station transmission power for each of the plurality of users after it has been determined that each of the plurality of users is communicating with the mobile network from the first underperforming geographic region.

In another example, the determining element determines whether each of a plurality of a subset of the plurality of the users is communicating with the mobile network from the first underperforming geographic region; and the adjusting element adjusts a base station transmission power for each of the plurality of the subset (e.g., independently) after it has been determined that each of the plurality of the subset is communicating with the mobile network from the first underperforming geographic region.

In another example, the adjusting element adjusts the base station transmission power for the first user based at least in part upon the received historic data and the received real-time data.

In another example, the adjusting element adjusts the base station transmission power for the first user based at least in part upon the received historic data for the first underperforming region and the received real-time data for the first underperforming region.

In another example, the higher occurrence of dropped calls comprises one of: (a) an absolute higher occurrence of dropped calls; and (a) a percent occurrence of dropped calls relative to a number of users.

In another example, the adjustment of the base station transmission power in the first underperforming region for the first user results in at least one less dropped call for the first user while in the first underperforming region than would have occurred in the absence of the adjustment of the base station transmission power in the first underperforming region for the first user.

In another example, the historic data further comprises data that is indicative of historic usage in a geographic region at which a group of people gather.

In another example, the group of people gather at a spectator event (e.g., a sporting event, a political rally, a theatrical event).

In another example, the geographic region at which the spectator event occurs comprises a stadium (e.g., an outdoor stadium, an indoor stadium).

In another example, the group of people gather at an emergency response situation (e.g., a natural disaster such as a hurricane, a tornado, an earthquake, a flood or a man-made disaster such as a transportation or industrial accident).

In another example, the data that is indicative of historic usage in a geographic region at which the group of people gather is used to build a model applicable to a group of people gathering at a different geographic region (e.g., at a similar event).

In other examples, any steps described herein may be carried out in any appropriate desired order.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any programming language or any combination of one or more programming languages, including an object oriented programming language such as Java, Smalltalk, C++ or the like or a procedural programming language, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention may be described herein with reference to flowchart illustrations and/or block diagrams of methods, systems and/or computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus or other devices provide processes for implementing the functions/acts specified in the flowchart and/or block diagram block or blocks.

The flowcharts and block diagrams in the figures illustrate the architecture, functionality, and operation of possible implementations of systems, methods and computer program products according to various embodiments of the present invention. In this regard, each block in the flowcharts or block diagrams may represent a module, segment, or portion of code, which comprises one or more executable instructions for implementing the specified logical function(s). It should also be noted that, in some implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

It is noted that the foregoing has outlined some of the objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the features and applications of the invention. Other beneficial results can be realized by applying the disclosed invention in a different manner or modifying the invention in ways known to those familiar with the art. In addition, all of the examples disclosed herein are intended to be illustrative, and not restrictive.

What is claimed is:

1. A tangible computer readable storage medium, embodying a program of instructions executable by the computer for base station power control in a mobile network, wherein the mobile network covers a plurality of geographic regions and wherein a plurality of users are in communication with the mobile network, the program of instructions, when executing, performing the following steps:
   receiving, by the computer, historic data, wherein the historic data comprises data that is indicative of historic dropped calls within a respective one of each of the plurality of the geographic regions;
   receiving, by the computer, real-time data, wherein the real-time data comprises data that is indicative of real-time dropped calls within a respective one of each of the plurality of the geographic regions;
   determining by the computer, based at least in part upon the received historic data and the received real-time data, a first underperforming geographic region, wherein the first underperforming geographic region is determined as one of the plurality of geographic regions having a higher occurrence of dropped calls based on a percent occurrence of dropped calls relative to a number of users than at least one of the other plurality of geographic regions;
   determining by the computer whether a first one of the plurality of users is communicating with the mobile network from the first underperforming geographic region; and
   adjusting a base station transmission power in the first underperforming region for the first user after it has been determined that the first user is communicating with the mobile network from the first underperforming geographic region;
   wherein the adjustment of the base station transmission power in the first underperforming region for the first user results in at least one less dropped call for the first user while in the first underperforming region than would have occurred in the absence of the adjustment of the base station transmission power in the first underperforming region for the first user.

2. The tangible computer readable storage medium of claim 1, wherein the historic data further comprises data that is indicative of historic usage within a respective one of each of the plurality of the geographic regions.

3. The tangible computer readable storage medium of claim 1, wherein the real-time data further comprises data that is indicative of real-time usage within a respective one of each of the plurality of the geographic regions.

4. The tangible computer readable storage medium of claim 1, wherein the program of instructions, when executing, further performs the following steps:
   determining by the computer whether each of the plurality of the users is communicating with the mobile network from the first underperforming geographic region; and
   adjusting a base station transmission power for each of the plurality of users after it has been determined that each of the plurality of users is communicating with the mobile network from the first underperforming geographic region.

5. The tangible computer readable storage medium of claim 1, wherein the program of instructions, when executing, further performs the following steps:
   determining by the computer whether each of a plurality of a subset of the plurality of the users is communicating with the mobile network from the first underperforming geographic region; and
   adjusting a base station transmission power for each of the plurality of the subset after it has been determined that each of the plurality of the subset is communicating with the mobile network from the first underperforming geographic region.

6. The tangible computer readable storage medium of claim 1, wherein the program of instructions, when executing, further performs the following step: adjusting the base station transmission power for the first user based at least in part upon the received historic data and the received real-time data.

7. The tangible computer readable storage medium of claim 1, wherein the program of instructions, when executing, further performs the following step: adjusting the base station transmission power for the first user based at least in part upon the received historic data for the first underperforming region and the received real-time data for the first underperforming region.

8. The tangible computer readable storage medium of claim 1, wherein the historic data further comprises data that is indicative of historic usage in a geographic region at which a group of people gather.

9. The tangible computer readable storage medium of claim 8, wherein the group of people gather at a spectator event.

10. The tangible computer readable storage medium of claim 9, wherein the geographic region at which the spectator event occurs comprises a stadium.

11. The tangible computer readable storage medium of claim 8, wherein the group of people gather at an emergency response situation.

12. The tangible computer readable storage medium of claim 8, wherein the data that is indicative of historic usage in a geographic region at which the group of people gather is used to build a model applicable to a group of people gathering at a different geographic region.

13. A computer-implemented system for base station power control in a mobile network, wherein the mobile network covers a plurality of geographic regions and wherein a plurality of users are in communication with the mobile network, the system comprising:
   a receiving element configured to: (a) receive historic data, wherein the historic data comprises data that is indicative of historic dropped calls within a respective one of each of the plurality of the geographic regions; and (b) receive real-time data, wherein the real-time data comprises data that is indicative of real-time dropped calls within a respective one of each of the plurality of the geographic regions;
   a determining element in operative communication with the receiving element configured to determine: (a) based at least in part upon the received historic data and the received real-time data, a first underperforming geographic region, wherein the first underperforming geographic region is determined as one of the plurality of geographic regions having a higher occurrence of dropped calls based on a percent occurrence of dropped calls relative to a number of users than at least one of the other plurality of geographic regions; and (b) whether a first one of the plurality of users is communicating with the mobile network from the first underperforming geographic region; and an adjusting element in operative communication with the determining element and the base station for adjusting base station transmission power in the first underperforming region for the first user after it has been determined that the first user is communicating with the mobile network from the first underperforming geographic region;

wherein the adjustment of the base station transmission power in the first underperforming region for the first user results in at least one less dropped call for the first user while in the first underperforming region than would have occurred in the absence of the adjustment of the base station transmission power in the first underperforming region for the first user.

14. The system of claim 13, wherein the historic data further comprises data that is indicative of historic usage within a respective one of each of the plurality of the geographic regions.

15. The system of claim 13, wherein the real-time data further comprises data that is indicative of real-time usage within a respective one of each of the plurality of the geographic regions.

16. The system of claim 13, further comprising:
determining by the determining element whether each of the plurality of the users is communicating with the mobile network from the first underperforming geographic region; and adjusting by the adjusting element a base station transmission power for each of the plurality of users after it has been determined that each of the plurality of users is communicating with the mobile network from the first underperforming geographic region.

17. The system of claim 13, further comprising:
determining by the determining element whether each of a plurality of a subset of the plurality of the users is communicating with the mobile network from the first underperforming geographic region; and adjusting by the adjusting element a base station transmission power for each of the plurality of the subset after it has been determined that each of the plurality of the subset is communicating with the mobile network from the first underperforming geographic region.

18. The system of claim 13, further comprising adjusting by the adjusting element the base station transmission power for the first user based at least in part upon the received historic data and the received real-time data.

19. The system of claim 13, further comprising adjusting by the adjusting element the base station transmission power for the first user based at least in part upon the received historic data for the first underperforming region and the received real-time data for the first underperforming region.

20. The system of claim 13, wherein the historic data further comprises data that is indicative of historic usage in a geographic region at which a group of people gather.

21. The system of claim 20, wherein the group of people gather at a spectator event.

22. The system of claim 21, wherein the geographic region at which the spectator event occurs comprises a stadium.

23. The system of claim 20, wherein the group of people gather at an emergency response situation.

24. The system of claim 20, wherein the data that is indicative of historic usage in a geographic region at which the group of people gather is used to build a model applicable to a group of people gathering at a different geographic region.

* * * * *